Nov. 18, 1924.

H. H. WILLIS

CRANK

Filed Feb. 17, 1923

1,515,984

Inventor
H. H. Willis,

By C. A. Snow & Co.
Attorneys

Patented Nov. 18, 1924.

1,515,984

UNITED STATES PATENT OFFICE.

HUGH H. WILLIS, OF CULPEPER, VIRGINIA.

CRANK.

Application filed February 17, 1923. Serial No. 619,702.

*To all whom it may concern:*

Be it known that I, HUGH H. WILLIS, a citizen of the United States, residing at Culpeper, in the county of Culpeper and State of Virginia, have invented a new and useful Crank, of which the following as a specification.

This invention relates to cranking devices especially designed for use in cranking tractors or the like.

The primary object of the invention is to provide a device of this character which may be readily and easily secured to the crank shaft of an internal combustion engine to enable the crank shaft to be rapidly rotated.

Another object of the invention is the provision of means whereby a horse or other draft animal may be hitched to the cranking device to rotate the shaft and give the shaft and pistons of the motor their initial movements.

With the foregoing and other objects in view which will appear as the description proceeds, the invention resides in the combination and arrangement of parts and in the details of construction hereinafter described and claimed, it being undersood that changes in the precise embodiment of the invention herein disclosed, may be made within the scope of what is claimed, without departing from the spirit of the invention.

Referring to the drawing:—

Figure 1:
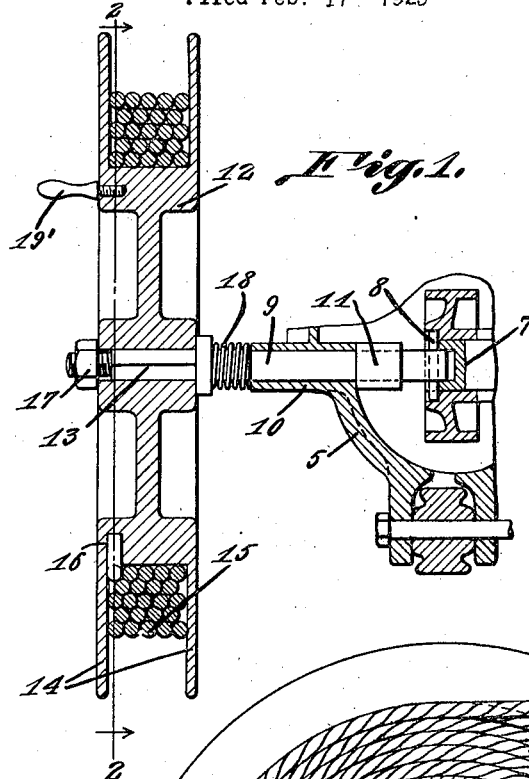
Figure 1 is a sectional view through the cranking device and disclosing the forward portion of the crank shaft.
Figure 2:
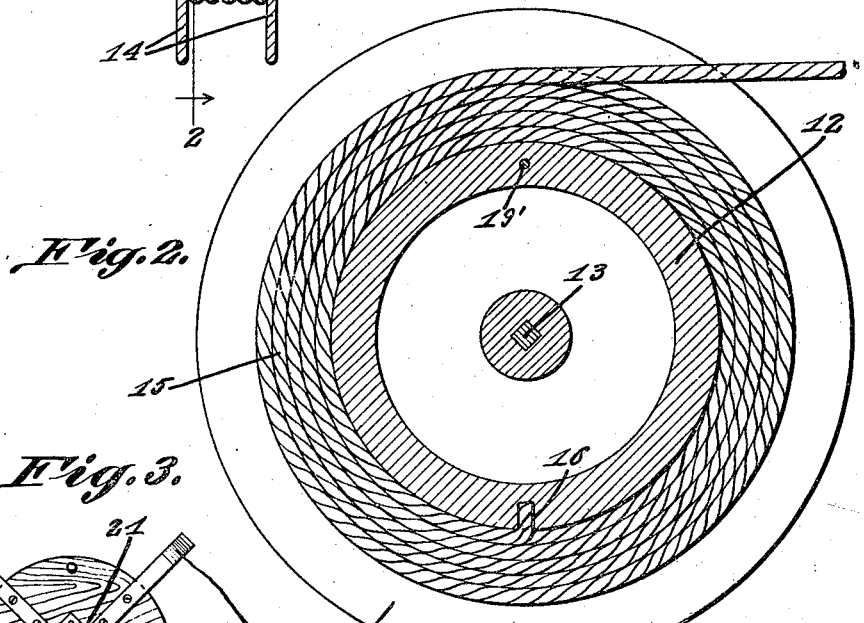
Figure 2 is a sectional view taken on line 2—2 of Figure 1.

Referring to the drawing in detail, the reference character 5 designates the forward portion of a crank case in which the forward end 7 of the crank shaft operates, the same being shown with recessed portions to receive the transversely extending pin 8 of the cranking shaft 9.

The cranking shaft 9 extends through the bearing 10 and supports a sleeve 11 that engages the inner end of the bearing 10 to contact with the pin 8 when the shaft 9 is thrown out of engagement with the crank shaft 7, and restrict movement of the cranking shaft.

The outer extremity of the cranking shaft is square in cross section and accommodates the pulley indicated at 12 which is formed with a square opening fitted over the squared end 13 of the shaft 9. As shown, the pulley 12 is formed with relatively wide flanges 14, between which the rope or other flexible means may be wound, the rope in the present showing, being indicated at 15 and having one of its ends positioned in an opening formed in the pulley as at 16.

The shaft 9 is threaded to accommodate the nut 17, whereby the pulley may be readily and easily removed from the shaft when not in use. In order that the shaft 9 will be thrown out of engagement with the shaft 7, a coiled spring 18 is used and disposed between the outer end of the bearing 10 and the pulley to normally force the pulley outwardly, away from the bearing 10.

A handle indicated at 19' has connection with the pulley 12 and provides means whereby the pulley may be rotated in one direction to wind the flexible member or rope 15 thereon. It is also pointed out that this handle may be employed for rotating the pulley in the opposite direction to accomplish the cranking of the motor, associated therewith when the use of the flexible member or rope 15, is unnecessary.

Figure 3:
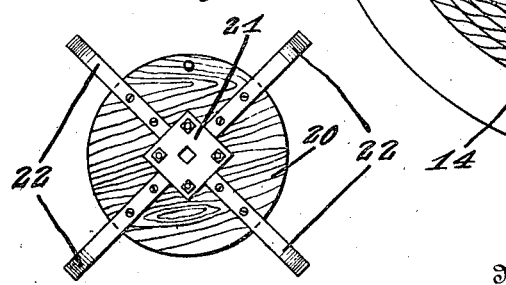
Figure 3 is a side elevational view of a modified form of the invention.

In the form of the invention as illustrated by Figure 3 of the drawing, a pulley is indicated at 20 which is formed with a central opening to accommodate the cranking shaft, plates 21 being provided and supplied with squared openings to fit over the squared end of the cranking shaft, so that movement of the pulley will result in a relative movement of the cranking shaft.

Pairs of arms 22 are secured to the pulley the pairs of arms being arranged on opposite sides thereof, constituting guards to prevent the flexible member, wound thereon, from moving laterally.

In the use of the device, the flexible member or rope is wound on the pulley, whereupon a horse or other draft animal is hitched to the free end of the rope. As the animal advances, the pulley is rapidly rotated to the end that the cranking shaft and crank shaft are rotated to give the motor, of which the crank shaft is a part, its initial movement.

What is claimed as new is:—

In a cranking device for internal combustion engines, a bearing member, a cranking shaft mounted in the bearing member and carrying a transversely extending pin at one end thereof, said pin adapted to be positioned in one end of a crank shaft to transmit movement of the cranking shaft to the crank shaft, a sleeve on the cranking shaft, and adapted to engage one edge of the bearing, said sleeve adapted to be engaged by the pin to restrict movement of the cranking shaft within its bearing, means on the cranking shaft for rotating the crank shaft, and means for normally urging the cranking shaft to its inactive position.

In testimony that I claim the foregoing as my own, I have hereto affixed my signature in the presence of two witnesses.

HUGH H. WILLIS.

Witnesses:
I. E. SIMPSON,
J. R. PATTISON.